United States Patent [19]

Domic et al.

[11] 4,028,462
[45] June 7, 1977

[54] METHOD OF EXTRACTION INVOLVING THE USE OF SOLVENTS AND NEW COMBINATION OF REACTORS USED

[75] Inventors: Esteban Domic; Albert Sfeir; Jorge Sandoval, all of Santiago, Chile

[73] Assignee: Corporacion de Fomento de la Produccion, represented by Comite de Investigaciones Technologicas, Santiago, Chile

[22] Filed: May 22, 1975

[21] Appl. No.: 580,038

Related U.S. Application Data

[63] Continuation-in-part of Ser. No. 392,216, Aug. 28, 1973, abandoned.

[30] Foreign Application Priority Data

Aug. 28, 1972 Chile .................................. 609-72

[52] U.S. Cl. .................................. 423/24; 75/117; 75/101 BE; 210/24; 210/38 B; 423/658.5; 210/37 B
[51] Int. Cl.² .................... C22B 15/00; C22B 3/00
[58] Field of Search .................... 423/658.5, 24; 75/101 BE, 117; 210/24, 37, 38

[56] References Cited

UNITED STATES PATENTS

| 3,193,381 | 7/1965 | George et al. | 75/108 |
| 3,853,981 | 12/1974 | Hadzeriga | 423/24 |
| 3,857,919 | 12/1974 | Hazen et al. | 75/101 BE X |

Primary Examiner—G. Ozaki
Attorney, Agent, or Firm—Karl W. Flocks

[57] ABSTRACT

In a process of extraction involving the use of solvents, considerable increase is obtained in the effective load of the extraction phase and in the recovery factor, through a new combination of the reactors employed in order that the loading and unloading stages of the organic phase may alternate.

9 Claims, 6 Drawing Figures

METHOD OF EXTRACTION INVOLVING THE USE OF SOLVENTS AND NEW COMBINATION OF REACTORS USED

FIELD OF THE INVENTION

This is a Continuation-in-Part application of Ser. No. 392,216 filed Aug. 28, 1973 now abandoned in favor of the present application.

This invention involves methods by which to separate the various constituents of a mixture or solution, e.g. a mixture of metals, and, specifically, that method commonly known as "solvent extraction" or "liquid-liquid extraction." It is a well known fact that extraction involving the use of solvents requires that the constituents of the mixture or solution posses a different solubility in two liquid solvents (one organic and the other aqueous), that are non-miscible with each other, or that are only partially soluble.

BACKGROUND OF THE INVENTION

Those processes of extraction involving the use of solvents may be divided into two categories, according to the causes that originate the difference in solubility: those cases in which such difference arises from physical causes and, those in which the difference is brought about by a chemical interaction between one or more of the diluted substances and one of the solvents employed.

Extraction involving the use of solvents is based on the co-existence of two liquid phases, one organic and the other aqueous, between which a given proportion of the diluted substance, e.g. metal, is distributed. There is a determined balance or equilibrium point to ascertain this proportion and such balance point is known as the distribution factor. The ratio in which the concentrations of the various diluted substances are found, in relation to the solvent media used, determines the distribution factor.

The separation of the substance or substances sought to be extracted depends upon the balance in which the two indicated liquid phases -organic and aqueous- are found, determined by the control held over chemical factors such as pH, concentrations, etc., on the basis of the volumetric relation between the relative quantities of both contacting phases. Should the recuperation achieved be small, this can be increased either by altering the previously indicated volumetric relation, or by adding new contact stages between both phases.

In the conventional solvent extraction practice, there exist two inseparable operations: the organic solvent loading and the organic solvent unloading. When the extraction steps proceed, the organic phase is loaded with the substance or substances, e.g. metallic, to be extracted from the original aqueous phase. This loading is always achieved in several and successive loading stages or contacts between the two phases till the organic phase is charged tending to the maximum thermodynamically permissible. The solvent extraction as an unit operation is still not concluded. The next successive contacts proceed between the loaded organic phase and a new aqueous phase, the stripping aqueous flow, which has distinct characteristics as the first one, in such a way that the organic phase is discharged, eluted, or stripped, and then returned to the first extraction stage, and so closing the organic circuit.

Three procedures to obtain this multiple contact in an industrial form are known for their efficiency:

a. Co-current flow, in which the organic and the aqueous phases flow through the reactors, making contact in successive stages, in the same direction. Two circuits are used, one to load the organic (extraction) and another to unload it (stripping or elution). An outline of this procedure is shown in FIG. 1. $Ac_1$ represents the flow of aqueous solution subject to the extraction process. $Ex_1$, $Ex_2$ and $Ex_3$ define the extraction reactors through which aqueous solution $Ac_1$ flows. $Ac_2$ is the flow of the stripping aqueous solution, and $El_1$ and $El_2$ indicate the elution reactors through which the latter flows. ORG. denotes the solution or organic phase that flows successively through the extraction and elution reactors. The arrows show the direction of the flow in each case.

b. Counter current flow, in which the phases flow in opposite direction along the reactors or contact stages. Loading and unloading circuits must likewise be used. This procedure has been outlined in FIG. 2, whose symbols are the same as those of FIG. 1. It may be noticed that the direction of the flow of the extraction and stripping aqueous phases is different, compared to the organic phase flow direction.

c. Crossed flow, in which one phase flows along the reactors going through the successive stages and the other phase flows through each stage only once, "crossing" the other flow. This procedure also requires several loading units and several stripping units. FIG. 3 depicts such a procedure. The symbols are the same as those used in FIGS. 1 and 2.

Each system has its own advantages and deficiencies, which makes them appropriate for various industrial situations. The goal is to maintain a high driving force, proportional to the concentration difference of the element to be extracted in both phases.

The co-current system is useful for processes whose distribution factor is very high, thus making it very easy for the organic phase to receive the component in the aqueous phase.

In systems whose coefficient is lower, the organic and aqueous phases must be put into contact in such a way as to have the solutions come into contact through the most concentrated stage of one phase with the most diluted stage of the other phase. Thus, an adequate efficiency of the system is maintained.

The crossed flow system endeavors to have one "fresh" or recently unloaded organic phase make contact with each one of the successive stages, in such a way that the organic phase reloads decreasingly in each stage.

This system is very practical when a large quantity of the phase that loads the system is available, inasmuch as a great volume of this phase, with the given organic-aqueous proportion, is required for each stage.

Generally speaking, all systems in use try to load the organic phase to the maximum during the successive stages of extraction, and to unload the organic phase as much as possible in the successive stages of stripping, thus enabling use of the highest effective load of this phase.

This is done, with either one circuit or another in successive loading (or unloading) contacts, in order to arrive whenever possible at the balance point between the phases.

Under equivalent conditions, the indicated systems operate with the following virtues and defects.

Co-current: Requires many stages in order to reach high yields. It is limited by only one balance point provided by the relation between the input variables of the solution into the system. The maximum load is not rapidly attained in the organic phase.

Counter current: Requires a fewer number of stages. The organic phase is easily and rapidly loaded. It is limited by the successive balances reached in each stage.

Crossed flow: Is equivalent to one system of balance for each stage. It loads the organic increasingly of decreasingly according to the direction of the other. It requires many times more volume of organic phase than in the previous cases (in the event that the organic phase should cross the aqueous flow).

From the standpoint of maximum recovery of the element as of the aqueous phase, the co-current system presents the poorest condition in relation to the other two; the counter current, on making the less loaded organic phase contact the more so aqueous one and vice versa at the other extreme of the system, allows a good recovery, in equal number of stages. The crossed flow procedure may easily register recoveries of around 100% but with a very high volume of organic to treat the same aqueous volume.

The U.S. Pat. No. 3,193,381 to George et al shows two independent solvent extraction operations for the iron circuit (shown on the left side of the drawing). The first is a solvent extraction system to separate iron from the main flow (which contains also nickel and cobalt) using dioctyl phosphate (or other organic solvent) which is stripped with a high acid stripping solution. Then there proceeds the second solvent extraction circuit using a different organic solvent under other chemical conditions, which uses water as a stripping reagent. So, in the first operation iron is removed from the original solution (containing nickel and cobalt), and then proceeds the second operation starting with the stripping flow of the preceding process (this new flow is a high acid iron solution) and using another reagent in order to regenerate the acid and to put iron in the second stripping flow (water) which is discarded (without acid, economically). Additionally, in the George et al patent both solvent extraction circuits (for iron) are made with the normal counter current arrangement of aqueous and organic phase flows.

SUMMARY

It is very important to realize that none of the described prior systems interrupt the charging steps to discharge the organic phase (or the stripping steps to charge it). All of such systems go through the loading (or the unloading) steps straight from step 1 to the last step.

This way of charging the organic phase could be improved, because it allows only a limited charge due to the fact that the driving force is maintained or only slightly increased along the successive steps. The way to improve this driving force is to discharge partially the organic phase, before EACH EXTRACTION STEP, so the avidity of the organic phase is always maintained in a high level in such a way that its effective charge is greatly improved per cycle.

The present invention relates to a procedure intended to load or unload (partially or fully) the organic phase in an ALTERNATE manner. Thus the effective load of the organic phase between both extremes of the system is enormously multiplied. It has now been found that interrupting the extracting circuit and discharging partially, or totally, the organic phase results in a great decrease of the final concentration of the aqueous phase processed (e.g. see Table 2). So the purpose of the research performed leading to the present invention was to find a practical way to carry out this intermediate operation. This invention allows using a series of combinations of alternate loading and unloading stages, which provide a noticeable increase in the recovery efficiency.

this invention specifically refers to the system of multiple stages already indicated and in which both liquid phases, organic and aqueous, make contact with each other in the successive reactors through which they flow. In each reactor or contact-separation stage, the concentration of the element, e.g. metal, being thus recovered decreases in the aqueous phase and increases in the organic phase, when it is a matter of loading the organic phase. When the organic phase element is unloaded, it makes contact with a pure aqueous solution of the element to be recovered, in such a way as to obtain an aqueous solution of such element, a product of the unloading of the organic phase.

The system of the present invention permits recovery very near 100% in only a few stages and using an organic volume in the entire system equivalent or smaller than that used by the counter current system. The loading and unloading circuits are all integrated and included in a combination of alternate stages.

BRIEF DESCRIPTION OF DRAWINGS

Using the same conventional equipment, and by means of a new combination of the stages, a result far superior to those of the known systems, shown in FIGS. 1–3, is attained. The interconnection of the stages is completely different, and it is explained in FIGS. 4, 5 and 6, which show three different embodiments of the application of the alternate procedure in accordance with the present invention.

DETAILED DESCRIPTION OF EMBODIMENTS

Figure 4:
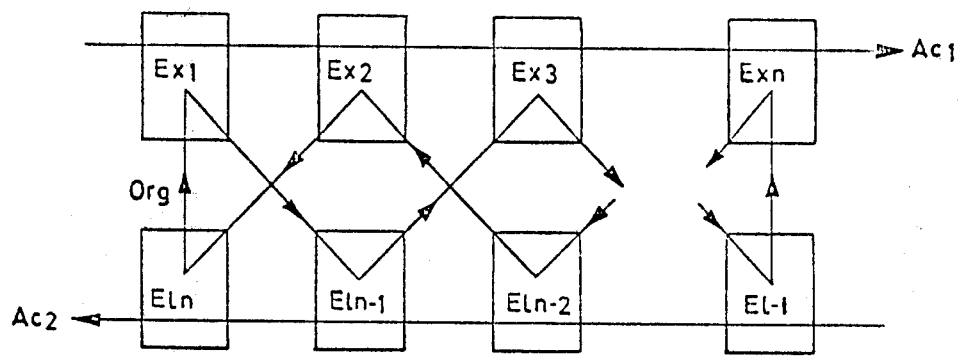

FIG. 4 shows the double alternate interconnection. The symbols are the same as those previously used. Phases $Ac_1$ (aqueous solution subjected to the extraction procedure) and $Ac_2$ (elution aqueous solution) flow in opposite directions. The organic phase alternatively flows from the extraction reactors to the elution reactors forming one single double cycle.

Figure 5:
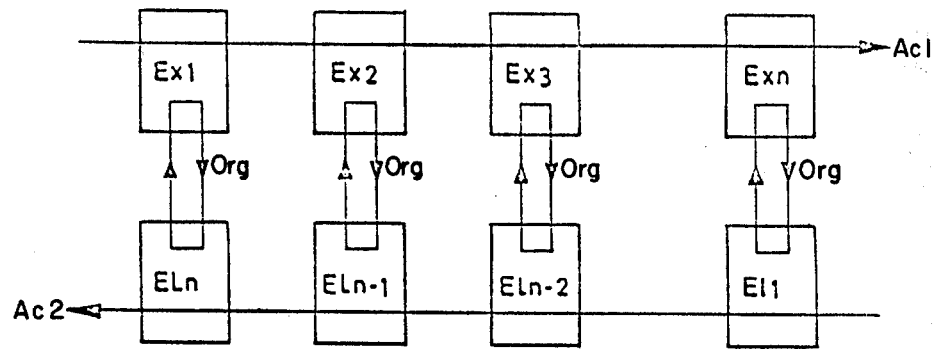

FIG. 5 registers the alternate interconnection in closed cycles. The organic phase circulates from each extraction reactor to each stripping reactor in parallel cycles.

Figure 6:
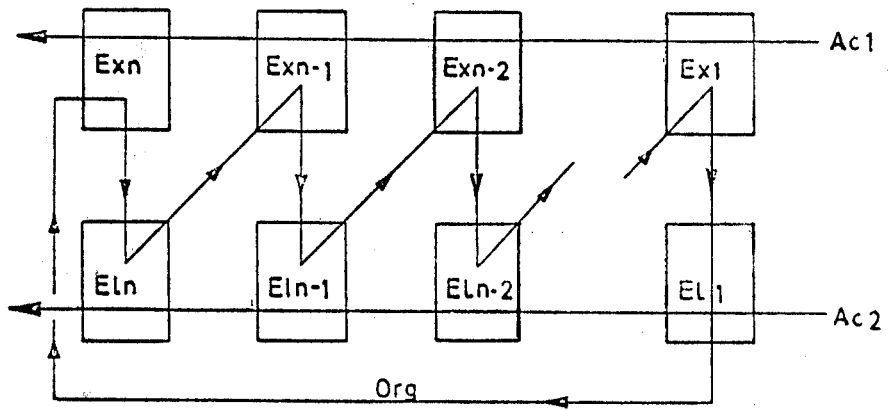

FIG. 6 shows the alternate zig-zagging interconnection. The organic phase flows in a simple cycle, alternating from the extraction to the elution reactors.

Finally, the scope of this improvement comprises an "alternate" solvent extraction process particularly for metals involving the main operations of loading and unloading of an organic solvent. As examples of organic solvents suitables for the extraction of metls it can be mentioned: oximes, amines, phenols, ketones, alcohols, fatty acids, organophosphoric acids, naphthenic acids, etc. Similarly, some of the elements which can be extracted are: beryllium, boron, cadmium, cobalt, copper, gold, nickel, phosphorus, tungsten, thorium, silver, uranium, rare earths, zinc, and many other metals. All these cases are suitable to apply to this improvement.

Experiments carried out lead to the conclusion that the economic yield of this new system of the present invention represents values that are far superior to those of the counter current flow system, and from similar to superior compared with the yields of the crossed flow system. Yet, the present system does not require additional installations and also it does not require more organic inventory than that used in the counter current system (it requires less than the crossed flow system), in spite of the fact that the recovery factor is higher and the effective load of the organic phase is higher too. From the example that follows as shown in the following chart, the best result of the invention may be appreciated, as compared to the known procedures.

The following example is included to illustrate the invention. The example is illustrative only and does not constitute limitations on the invention.

EXAMPLE

An aqueous feed solution to be extracted was prepared having a concentration of copper of 25 grams per liter (g/l) and the pH 2.5. Pure aqueous stripping solution was prepared having a copper concentration of 10 g/l and 400 g/l of sulfuric acid. The organic phase was prepared diluting a selective reagent (a substituted oxime, commercially known as LIX), in kerosene.

The equipment used were laboratory scale mixer-settlers. The volumetric ratios of the organic phases to the aqueous phases were: 4.0 for the extraction stages and: 2.0 for the stripping stages. In all the cases the flow of the aqueous feed solution to be extracted was extrapolated (with comparative purposes) to 25 milliliters per minute.

Figure 1:
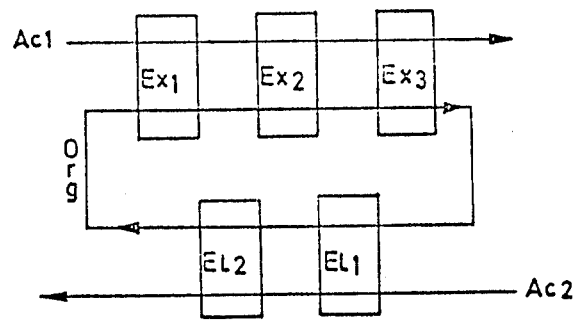
Figure 2:
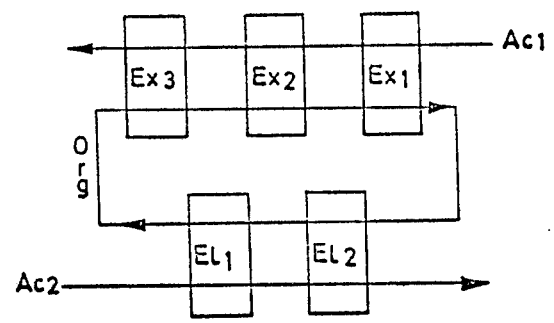
Figure 3:
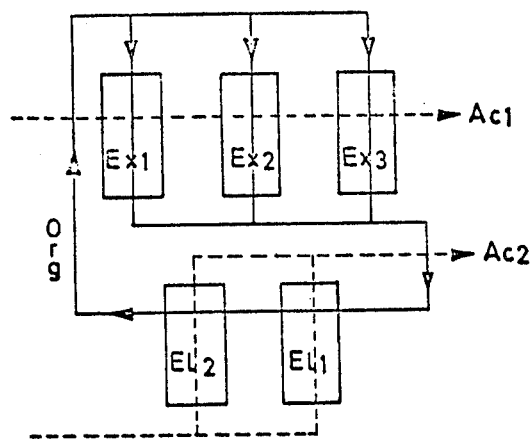

Several experiments were conducted changing only the reactors arrangement:

a. Using a co-current flow like that indicated in FIG. 1.
b. Using a countercurrent flow like that of FIG. 2.
c. Using a crosscurrent arrangement like FIG. 3.
d. The proposed alternate flow used in FIG. 6 (similar results were obtained using the arrangements of FIGS. 4 and 5).

The copper analysis profile of each arrangement is indicated in the Table, the concentrations being in grams per liter.

TABLE

| STAGES | | CASES | | | |
|---|---|---|---|---|---|
| | | a | b | c | d |
| 1st extraction | Organic | 4.0 | 8.0 | 6.3 | 6.2 |
| | Aqueous | 17.0 | 17.8 | 8.0 | 9.0 |
| 2nd extraction | Organic | 5.5 | 6.2 | 3.5 | 3.6 |
| | Aqueous | 11.0 | 7.0 | 2.0 | 2.6 |
| 3rd extraction | Organic | 6.7 | 3.5 | 2.4 | 2.9 |
| | Aqueous | 8.0 | 1.0 | 0.4 | 0.2 |
| 1st stripping | Organic | 4.2 | 2.9 | 2.5 | 2.0 |
| | Aqueous | 15.0 | 20.2 | 13.2 | 11.8 |
| 2nd stripping | Organic | 2.4 | 2.0 | 2.0 | 2.3 |
| | Aqueous | 18.6 | 22.0 | 11.0 | 19.6 |
| 3rd stripping | Organic | — | — | — | 2.2 |
| | Aqueous | — | — | — | 22.4 |
| effective organic loading (per cycle) | | 4.3 | 6.0 | 2.1 | 6.2 |
| Copper extracted % | | 68 | 96 | 98.4 | 99.2 |
| relative flows used: | | | | | |
| organic | | 100 | 100 | 300 | 100 |
| aqueous feed sol. | | 50 | 50 | 150 | 50 |
| aqueous strip. sol. | | 25 | 25 | 25 | 25 |

The results of the example shown (and of many other similar experiments performed with other parameters) indicate that the cases $c$ and $d$ give always the best performance in terms of copper recovery, but case $c$ requires (for the same performance) three times the organic volume of case $d$, so greatly increasing its expensive inventory.

On the other hand, the effective organic load is better for case $d$, in such a way that with the same circuit and organic volume it could treat 25% more aqueous feed solution than case $b$.

What is claimed is:

1. In a liquid-liquid extraction process for the extraction of a constituent from an aqueous solution through the use of an organic solvent, in which process said constituent is extracted from the aqueous feed solution into said organic solvent and backwashed into an aqueous elution solution, wherein successive extraction and successive elution contacts occur, the improvement comprising
   partially discharging said constituent from said organic solvent through contact of said organic solvent with said aqueous elution solution after each extraction contact.

2. In a liquid-liquid extraction process for the extraction of a connstituent from an aqueous solution through the use of an organic solvent in which process said constituent is extracted from the aqueous feed solution into said organic solvent and backwashed into an aqueous elution solution, wherein successive extraction and successive elution contacts occur, the improvement comprising
   passing said organic solvent through an extraction stage after each elution stage, to charge said organic solvent with said constituent during each said extraction stage.

3. In a liquid-liquid extraction process for the extraction of a constituent from an aqueous solution through the use of an organic solvent in which process said constituent is extracted from the aqueous feed solution into said organic solvent and backwashed into an aqueous elution solution, wherein several extraction and several elution contacts occur, the improvement comprising
   flowing said organic solvent alternatively through an extraction contact and then through an elution contact, so that the loading and unloading of the organic solvent with said constituent proceeds alternatively from stage to stage.

4. In a process for the extraction of a constituent of an aqueous solution through the use of an organic solvent, in which process said constituent is extracted from the aqueous feed solution into said organic solvent and backwashed into an aqueous elution solution, wherein successive extraction and successive elution contacts occur, the improvement comprising
   passing said aqueous feed solution through successive $n$ extraction stages in series; passing said aqueous elution solution through successive $n$ elution stages in series, counter-current to said extraction stages; and passing said organic solvent in a closed loop from the first extraction stage to the $n$-lst elution stage to the 3rd extraction stage and alternating to the first elution stage, and then to the nth extraction stage and alternating to the $n$-2nd elution stage to the second extraction stage to the nth elution stage, and back to the first extraction stage.

5. A process in accordance with claim 4 wherein said constituent extracted is copper.

6. In a process for the extraction of a constituent of an aqueous solution through the use of an organic solvent, in which process said constituent is extracted from the aqueous feed solution into said organic solvent and backwashed into an aqueous elution solution, wherein successive extraction and successive elution contacts occur, the improvement comprising passing said aqueous feed solution through successive $n$ extraction stages in series; passing said elution aqueous elution solution through successive $n$ stages in series, countercurrent to said extraction stages; and passing said organic solvent in a series of parallel closed loops, said closed loops being respectively between the first extraction stage and the $n$th elution stage, the second extraction stage and the $n$-1st elution stage and so on, there being as many closed loops as there are stages.

7. A process in accordance with claim 6 wherein said constituent extracted is copper.

8. In a process for the extraction of a constituent of an aqueous solution through the use of an organic solvent, in which process said constituent is extracted from the aqueous feed solution into said organic solvent and backwashed into an aqueous elution solution, wherein successive extraction and successive elution contacts occur, the improvement comprising passing said aqueous feed solution through successive $n$ extraction stages in series; passing said aqueous elution solution through successive $n$ elution stages in series, concurrent to said extraction stages; and passing said organic solvent countercurrent to said aqueous solutions in an alternating manner between extraction and elution stages so that said organic solvent passes from the $n$th extraction stage to the $n$th elution stage to the $n$-1st extraction stage to the $n$-1st elution stage and so on to the 1st extraction stage to the 1st elution stage and back to the $n$th extraction stage.

9. A process in accordance with claim 8 wherein said constituent extracted is copper.

* * * * *